(12) United States Patent
Fehrenbacher et al.

(10) Patent No.: US 6,506,483 B1
(45) Date of Patent: Jan. 14, 2003

(54) CERAMIC FIBER DEBOND COATINGS

(75) Inventors: Larry Lee Fehrenbacher, Annapolis, MD (US); Mark Patterson, Annapolis, MD (US); Dave McQuiston, Washington, DC (US)

(73) Assignee: Technology Assessment & Transfer, Inc., Annapolis, MD (US)

( * ) Notice: Subject to any disclaimer, the term of this patent is extended or adjusted under 35 U.S.C. 154(b) by 0 days.

(21) Appl. No.: 09/560,796

(22) Filed: Apr. 28, 2000

(51) Int. Cl.[7] .............................. G21C 7/10; B32B 17/12
(52) U.S. Cl. ................ 428/293.4; 428/294.1; 376/327
(58) Field of Search ............... 428/293.4, 294.1; 376/327

(56) References Cited

U.S. PATENT DOCUMENTS 5,514,453 A * 5/1996 Goujard et al. ............ 428/213
6,071,615 A * 6/2000 Solow et al. ............... 428/408
6,117,534 A * 9/2000 Yamaamura et al. ..... 429/294.1
6,246,740 B1 * 6/2001 Maruyama et al. ......... 376/327

* cited by examiner

Primary Examiner—Cynthia H. Kelly
Assistant Examiner—Kimberly T. Nguyen

(57) ABSTRACT

Non-oxide debond coated reinforcing fibers that are resistant to oxidation at temperatures above about 1200° C. are described. The debond coatings are non-hygroscopic, and exhibit debond performance equal to or better than the prior art such coatings. The coated fibers of the present invention comprise a non-oxide fiber with or without a thin conventionally applied pyrolytic carbon layer overcoated with a non-hygroscopic silicon and titanium containing single or multi-layer structure that imparts all of the properties demanded of a debond coating while additionally providing exceptional oxidation resistance protection.

5 Claims, 2 Drawing Sheets

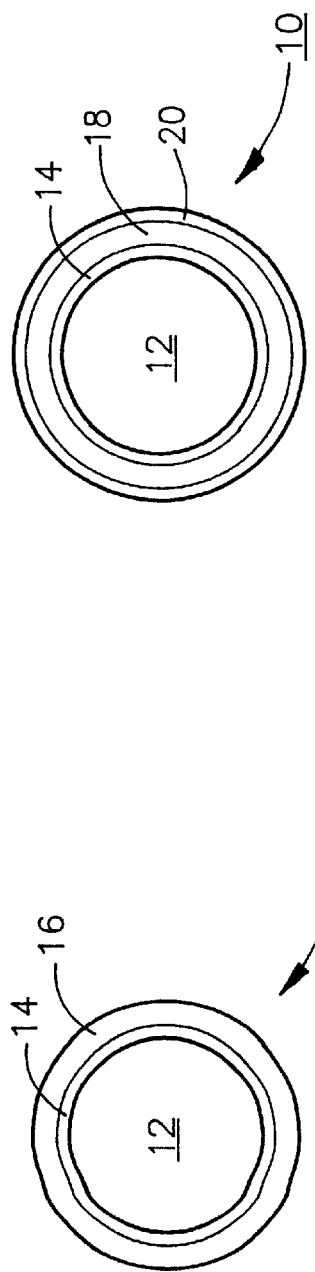
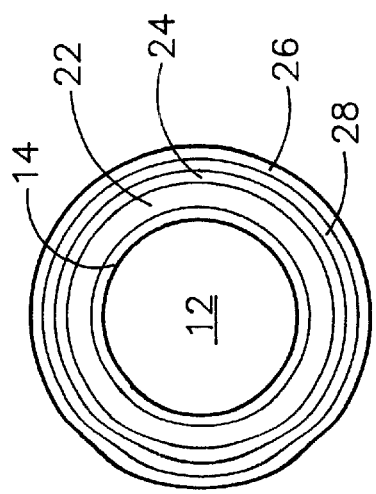
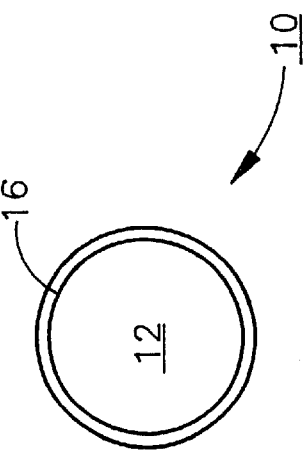
FIG. 1
FIG. 2
FIG. 3
FIG. 4

CERAMIC FIBER DEBOND COATINGS

FIELD OF THE INVENTION

The present invention relates to non-oxide fiber reinforced ceramic matrix composites and more specifically to fiber debond coatings for use therein.

BACKGROUND OF THE INVENTION

Continuous fiber reinforced ceramic matrix composites (CMCs) are being used and considered for a wide variety of components in advanced rocket propelled hypersonic missiles, reusable launch vehicles, air breathing turbine engines and a host of industrial applications. Candidate components include rocket thrusters and poppet valves of solid propulsion systems, rocket nozzle components and thermal protection systems for reusable launch vehicles, flameholders, combustors and divergent nozzle components for turbine engines. Currently, carbon fiber/silicon carbide ($C_f$/SiC), silicon carbide fiber/silicon carbide (SiC$_f$/SiC) and silicon carbide fiber/carbon (SiC$_f$/C) CMCs are the leading candidate materials for use in these applications. All of these CMCs depend on a fiber/matrix interface coating that is capable of transmitting the load from the matrix to the fibers as well as deflecting or blunting matrix cracks. The crack deflection capabilities are attributed to the interfacial slip or debonding of the interfacial coating from the fiber. The term debond coating is therefore commonly used. Therefore, the strength of the fiber debond coating to the fiber must be strong enough to transmit the matrix load but weak enough to debond from the fiber once cracks begin to propagate to the interface coating. Debond coatings must adhere to the underlying reinforcing fiber with enough strength to permit the fiber to provide its reinforcing function, while being able to "debond" from the fiber and allow relative movement between the fiber and the coating during a stress event.

Another candidate system involves the use boron nitride layers coated or otherwise applied over a carbon, graphitic, layer as the debond coating material.

These debond coatings are applied to the continuous fiber reinforcing materials in fiber reinforced, ceramic matrix composites prior to the matrix densification step to improve the toughness and ultimate strength of the composite structure by, in effect, deflecting the energy of what could otherwise be catastrophic cracking events in the ceramic matrix of such composite materials when they are subjected to excess pressure, e.g. impact pressure, especially at high temperatures.

A major life-limiting factor for non-oxide CMC materials (carbon and silicon carbide materials) is the lack of a robust fiber-matrix interface coating for use in oxygen/oxidizing environments. Carbon and boron nitride are the commercial interface coatings for non-oxide ceramics currently commonly used. Both pyrocarbon and boron nitride (BN) coatings are not resistant to attack in oxidizing atmospheres, particularly at high temperatures. The pyrolytic carbon coatings currently universally used on both $C_f$/SiC and SiC$_f$/SiC fibers are insufficient for long life components, particularly those that must operate in high temperature oxidizing environments. If stressed above the point where the matrix cracks, oxidants can penetrate into the fiber composite and oxidize the debond coating-matrix and debond coating-fiber interfaces. After very short periods of time, the composite's mechanical properties deteriorate and eventually the material becomes brittle. Although boron nitride has demonstrated the potential to perform better than conventional carbon as an interface material in oxidizing environments, it too suffers from degradation in the presence of air and or moisture and therefore becomes life limiting. In fact, boron nitride can be characterized as a hygroscopic material. This makes boron nitride prone to failure in moisture containing environments such as are encountered in combustion applications.

$Ti_3SiC_2$ is a material that possesses high thermal conductivity, high electrical conductivity, reasonable hardness, good oxidation resistance, unprecedented thermal shock resistance, high temperature plasticity and room temperature machinability. $Ti_3SiC_2$ appears to be the high temperature equivalent of graphite for oxidizing applications because the planes of silicon are linked together by TiC octahedra in a hexagonal crystal structure arrangement. Like graphite, hot pressed $Ti_3SiC_2$ samples exhibit surprising yield strength at high temperatures (350 Mpa at 1300° C.) and toughness (no degradation in strength after quenching from 1400° C.). By comparison, the strength capabilities of the best superalloys are 200° C. below 1300° C. A detailed microhardness indentation study has shown that in $Ti_3SiC_2$ no indentation cracks were seen at loads as high as 300N. Scanning electron microscope analysis of areas surrounding the indentations revealed multiple energy absorbing mechanisms including diffuse microcracking and buckling individual grains. In non-oxidizing environments $Ti_3SiC_2$ retains its hexagonal planar crystal structure and high toughness/low shear characteristics at temperatures exceeding 2500° F.

In brief, the wide temperature ductility, high thermal conductivity and oxidation resistance properties of $Ti_3SiC_2$ offers a fiber coating with unique energy absorbing capabilities that significantly reduces fiber cracking, oxidation and cyclic fatigue damage.

Similar results can be achieved in oxidizing environments by the application of single layer titanium suicides ($Ti_5Si_3$, $TiSi_2$), multi-layer coatings of SiC/TiC and/or $SiO_2$/$TiO_2$ to the fibers, the latter being formed in situ.

OBJECTS OF THE INVENTION

It is therefore an object of the present invention to provide more oxidation resistant and therefore longer lived reinforcing fibers for non-oxide, ceramic matrix composites.

It is another object of the present invention to provide methods for the production of such enhanced fiber reinforcing materials and non-oxide ceramic reinforced composites fabricated therewith.

SUMMARY OF THE INVENTION

According to the present invention there are provided non-oxide debond coated reinforcing fibers that are resistant to oxidation at temperatures above about 1200° C. The coatings of the present invention exhibit debond performance equal to or better than the prior art such coatings described above. The coated fibers of the present invention comprise a fiber overcoated with a non-hygroscopic, preferably silicon and titanium containing a single or multi-layer structure that imparts all of the properties demanded of a debond coating while additionally providing exceptional oxidation resistance protection. Single phase $Ti_3SiC_2$ coatings deposited onto carbon fibers, SiC fibers or other non-oxide fibers via chemical vapor deposition or otherwise form one of the embodiments of such coated fibers. According to a further preferred embodiment of the present invention, the coated fibers include an annular, thin, conventionally applied pyrolytic carbon layer between the fibers and the overcoated debond layer.

Multi-layer $SiO_2/TiO_2$ and SiC/TiC debond layers deposited by sol coating, chemical vapor infiltration or chemical vapor deposition processes or otherwise directly onto the fiber or over a thin conventionally applied carbon coating applied to the carbon, SiC or other non-oxide fibers optionally followed by oxidation of the deposited layer(s), form other embodiments of the improved debond coated fibers of the present invention. Single layers of titanium silicides ($Ti_xSi_y$, wherein x=1 or 5 and y=1,2,3) and bilayers or multiple bilayers of SiC/TiC or $SiO_2/TiO_2$ can also be applied for useful results in oxidizing environments.

DESCRIPTION OF THE DRAWINGS

The accompanying drawings wherein like numerals refer to like elements will permit a clearer understanding of the hereindescribed invention.

FIG. 1 is a cross-sectional view of one preferred embodiment of a non-oxide ceramic reinforcing fiber according to the present invention.

FIG. 2 is a cross-sectional view of an alternate preferred embodiment of a non-oxide, ceramic reinforcing fiber according to the present invention.

FIG. 3 is a cross-sectional view of another embodiment of a non-oxide ceramic reinforcing fiber according to the present invention.

FIG. 4 is a cross-sectional view of yet another embodiment of a non-oxide ceramic reinforcing fiber according to the present invention.

DETAILED DESCRIPTION

Figure 7:
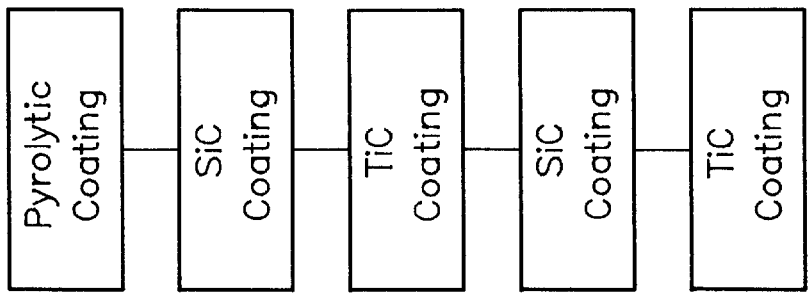
FIG. 7 is a process flow diagram for the application of multiple alternating SiC/TiC coating layers to a non-oxide reinforcing fiber.

According to the present invention, there are provided a novel class of debond coated non-oxide ceramic reinforcing fibers comprising a non-oxide continuous ceramic fiber, preferably carbon fiber or silicon carbide fiber, preferably, but not necessarily, first surface coated with a layer of pyrolytic carbon and then overcoated with one or more layers of a non-hygroscopic, oxidation resistant, protective material. According to various preferred embodiments of the instant invention, the non-hygroscopic oxidation resistant, protective layer(s) may comprise a monolithic layer of $Ti_3SiC_2$, $Ti_5Si_3$, $TiSi_2$, or TiSi, one or more layers of SiC/TiC or the oxidation product thereof, or one or more layers of $SiO_2/TiO_2$.

Referring now to FIG. 1 that depicts a cross-sectional view, according a first preferred embodiment of the present invention, the enhanced continuous reinforcing fiber of the present invention 10 comprises a continuous, non-oxide fiber core 12 having a thin, from about 0.1 μm to about 0.2 μm, layer 14 of pyrolytic carbon annularly applied about the surface thereof and a layer 16 of a non-hygroscopic, oxidation resistant material annularly applied thereover. In the embodiment depicted in FIG. 1, layer 16 is preferably $Ti_3SiC_2$ that is applied as described hereinafter.

FIG. 2 depicts an alternative preferred embodiment wherein non-hygroscopic, oxidation resistant layer 16 is applied annularly directly over the surface of continuous, non-oxide core 12 with no pyrolytic carbon layer 14 therebetween.

In the description and examples that follow, reference will be made to and description will be provided primarily of embodiments of the present invention that include pyrolytic carbon layer 14 as part of the structure or as a step in the fabrication process. It should be specifically noted that all such structures and the processes for preparing them can be identically prepared and performed without the presence of the pyrolytic carbon layer and both such structures and methods for their preparation are clearly intended and contemplated as within the scope of the appended claims and the herein described invention.

An alternate preferred embodiment of the present invention is depicted in FIG. 2. According to this embodiment, the debond coated reinforcing fiber 10 comprises a non-oxide continuous fiber core 12 having a similarly thin layer 14 of pyrolytic carbon about the surface thereof and a pair of non-hygroscopic, oxidation resistant layers 18 and 20 applied sequentially thereover as described hereinafter. According to a specifically preferred embodiment of the present invention, layers 18 and 20 are SiC and TiC, respectively. In an alternate preferred embodiment, the sequentially applied SiC and TiC layers are oxidized to $SiO_2$ and $TiO_2$. Oxidation resistant layers 18 and 20 can, of course, be coated directly over the surface of fiber core 12.

In the third alternative preferred embodiment of the present invention depicted in cross section in FIG. 3, the debond coated reinforcing fiber 10 of the present invention comprises a continuous fiber core 12 having a similarly thin layer of pyrolytic carbon 14 applied annularly thereabout that is subsequently coated as described hereinafter with alternating layers 22, 24, 26 and 28 that are respectively either SiC and TiC, or $SiO_2$ and $TiO_2$. This structure may be expanded to include a further plurality of such alternating layers. Again, alternating layers 22, 24, 26, and 28 can be coated directly onto the surface of fiber core 12 in the absence of pyrolytic carbon layer 14.

In each of the foregoing structures, the thickness of the pyrolytic carbon layer, when present, is preferably between about 0.1 μm and about 0.2 μm. Each of the other non-hygroscopic, oxidation resistant layers 16 through 28 and any additional protective layers are preferably between about 0.2 μm and about 0.5 μm thick in total, although thicker layers may of course be used in those applications where layer thickness does not affect the functionality of the coatings in the final composite structure. For example, the entire matrix could consist of a multi-layer structure.

While not wishing to be bound in any way by any specific mechanism that describes the effectiveness or functional operation of the improved reinforcing fibers described and claimed herein, it is postulated from the $TiO_2$—$SiO_2$ phase diagram that on oxidation of fibers with or without an inner carbon layer at the surface and one of the protective layers described herein coated thereover separate $SiO_2$ and $TiO_2$ layers are formed. $TiO_2$ is known to be a lubricious, low shear strength oxide that is ideal for an interface coating and that $SiO_2$ will provide oxidation resistance for both carbon and silicon carbide fibers. The effect of adsorbed water in these coatings appears to be negligible at temperatures of 700° C. and above. The immiscibility of these two materials even at temperatures up to about 1550° C. provides that they will each retain their inherent lubricious and antioxidant characteristics even at these temperatures. Hence, since $TiO_2$ and $SiO_2$ are the oxidation products of titanium suicides ($Ti_xSi_y$), $Ti_3SiC_2$ and SiC/TiC layers of these materials, upon oxidative attack they will provide $SiO_2$ and $TiO_2$ that will impart their respective needed properties to the reinforcing fiber at temperatures well in excess of 1200° C.

Figure 5:
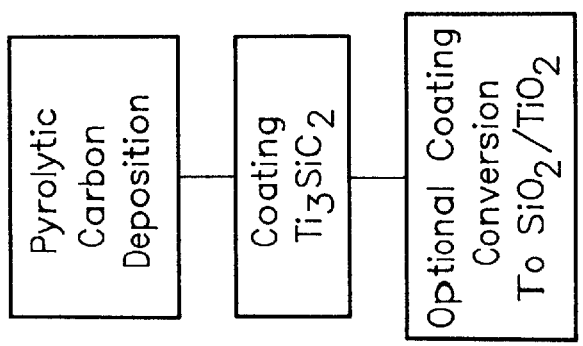
FIG. 5 is a process flow diagram for the application of $Ti_3SiC_3$ layers to non-oxide ceramic reinforcing fibers.

The preferred methods for the application of the non-hygroscopic, oxidation resistant coatings of the present invention to continuous non-oxide reinforcing fibers to yield the improved fibers of the present invention are presented schematically in FIGS. 4 and 5.

Referring now to FIG. 5, the continuous non-oxide reinforcing fiber is first, preferably, coated with a thin layer of pyrolytic carbon preferably applied by chemical vapor deposition (CVD) or chemical vapor infiltration (CVI) depending upon whether the fiber to be coated is in the form of a single fiber, fiber cloth or a preform shape. Deposition is accomplished by placement of the fiber, fiber cloth or preform into an appropriate reaction chamber of the type well known in the art and decomposing, for example, $CH_4$ or $C_3H_8$ at temperatures between about 1000 and 1300° C. and pressures of 10 Torr or less. This procedure is common to all of the fabrication processes described herein that apply pyrolytic carbon layer 14 regardless of the nature of the coatings (s) applied over pyrolytic carbon layer 14. Selection of the pyrolytic coating process as with all of the other coating processes described hereinafter will depend largely upon the form of the fiber being coated, i.e. whether it is in the form of a single continuous fiber, a fiber cloth (tow) or a preform. CVD coating is preferred for single fiber or fiber tow coating while CVI is preferred for coating of fibers as a preform.

In the case of the formation of the single phase $Ti_3SiC_2$ coatings described hereinabove, coating is accomplished through the introduction of: 1) the continuous fiber, cloth or preform along with; 2) $SiCl_4$, $TiCl_4$, and $CCl_4$ in relative concentrations according to the following reaction: $3TiCl + SiCl_4 + 3CCl_4$, (as specified further below) and 3) hydrogen and or hydrogen and argon as a carrier gas, into a suitable reaction chamber. Reaction is accomplished within the temperature range of from about 1000° C. and about 1600° C., preferably between about 1100° and about 1400° C. and most preferably between about 1100° C. and about 1200° C., at a pressure preferably below about 760 Torr, more preferably below about 400 Torr and most preferably below about 250 Torr and preferably for a period of from about 3 to about 240 minutes, more preferably from about 6 to about 60 minutes and most preferably from about 9 to about 30 minutes or until a thickness of from about 0.2 to about 0.5 $\mu$m of $Ti_3SiC_2$ has been deposited on the fibers. The carrier gas preferably comprises from about 32% to about 99% by weight hydrogen and from about 0% to about 69% by weight of argon, more preferably from about 48 to about 98% by weight of hydrogen and from about 0 to about 50% by weight of argon and most preferably from about 58 to about 98% by weight of hydrogen and from about 10 to about 40% by weight of argon. $TiCl_4$ is introduced preferably at a concentration of between about 0.06% and about 18% by weight, more preferably between about 0.2% and about 3% by weight and most preferably between about 0.4% by weight and about 2.2% by weight. $SiCl_4$ is preferably introduced at a concentration of between about 0.04% by weight and about 16% by weight, more preferably between about 0.15% and about 1.4% by weight and most preferably between about 0.2% and about 1.2% by weight. The concentration of $CCl_4$ introduced preferably ranges from about 0.02% to about 8% by weight, more preferably between about 0.15% and about 1.4% by weight and most preferably between about 0.2% and about 1.2% by weight. The deposited $Ti_3SiC_2$ coating may then optionally be converted to produce in situ a dual phase coating of $SiO_2/TiO_2$ by heating the coated fiber structure at a temperature of from about 1000° C. to about 1600° C. for a period of from about 1 minute to about 120 minutes. Most preferably, oxidation is accomplished by heating in air at a temperature of between about 1300° C. and about 1400° C. for a period of from about 10 minutes to about 20 minutes. As noted hereinabove, a similar process can be performed to provide the debond coatings of the present invention directly on the surface of fiber core 12 in the absence of any pyrolytic carbon layer 14 by the omission of the carbon application step.

The titanium silicide ($Ti_xSi_5$ wherein x=1 or 5 and y=1,2, or 3) layers(s) that can be subsequently oxidized according to the procedures described hereinabove are formed by the reaction between $TiCl_4$ and $SiCl_4$ described immediately hereinabove, but in the absence of the carbon contributing $CCl_4$.

Figure 6:
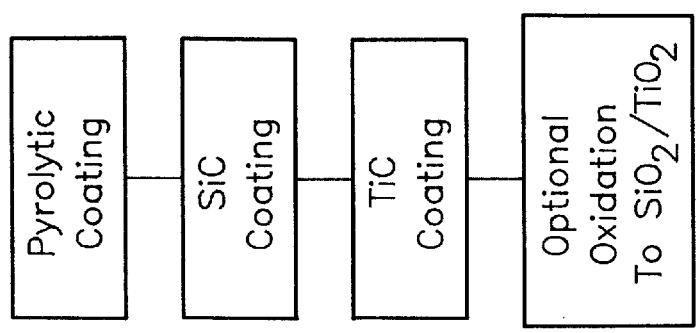
FIG. 6 is a process flow diagram for the application of SiC/TiC and $SiO_2/TiO_2$ layers to non-oxide ceramic reinforcing fibers.

Referring now to FIG. 6, the two layered coatings of SiC/TiC are formed by first forming the pyrolytic coating on the fibers either as individual fibers, fiber cloth or a preform as described above, and then sequentially forming layers of SiC and TiC thereover through CVD) or CVI (depending upon the form of the fiber i.e. continuous single fiber, fiber cloth or preform) by: A) decomposing trichloromethyl silane ($CH_3SiCl_3$) with hydrogen or hydrogen and argon as a carrier gas at a temperature of from about 800° C. to about 1600° C. and a pressure of from about 0 Torr to about 760 Torr for a period of from about 3 minutes to about 240 minutes and then B) reacting $TiCl_4$ with $C_3H_8$ in a concentration of from about 0.08% to about 1.5% $TiCl_4$ in $C_3H_8$ at a temperature of from about 1000° C. to about 1600° C. and a pressure of from about 0 Torr to about 760 Torr for a period of from about 15 seconds to about 30 minutes. The layered coating will consist of alternating 0.3 $\mu$m layers of SiC and TiC for a total coating thickness of 0.4 $\mu$m. Optionally, the coated ceramic fibers, cloth or preform may then be oxidized in air at a temperature as described hereinabove to produce a single layered $SiO_2/TiO_2$ structure prior to further processing. The identical process may, of course be performed in the absence of the pyrolytic carbon application step to obtain an equally useful product.

Referring now to FIG. 7, multi-layered $SiO_2/TiO_2$ structures may be produced by first applying the pyrolytic coating as described hereinabove to the ceramic reinforcing fiber, and then repeating the process described in connection with FIG. 6 several times, each time building alternating SiC/TiC layers only 0.05 $\mu$m thick to a total coating thickness of 0.5 $\mu$m. Oxidation of the coated ceramic fibers, cloth or preform by heating in air as described hereinabove yields a multi-layered $SiO_2/TiO_2$ structure prior to further processing. Again, the application of the pyrolytic carbon layer may be omitted to obtain a similarly useful product.

Coatings of TiC and SiC may also be applied according the procedures and under the reaction conditions described immediately hereinafter for the production of $SiO_2/TiO_2$ coatings, except that the carrier gas contains no water or $CO_2$.

Two layered and multi-layer oxide coatings can also be produced by sequential application of $SiO_2$ and $TiO_2$ over pyrolytic carbon layer 14 or directly to fiber core 12 as described hereinabove but in a hydrogen or hydrogen and argon plus $CO_2$ and water atmosphere comprised of from about 32% to about 99% by weight hydrogen, from about 0 to about 60% by weight argon, from about 0% to about 32% by weight of water and from about 0 to about 16% by weight of $CO_2$ at a temperature of from about 1000° C. to about 1600° C. and a pressure below about 760 Torr for a period of from about 15 minutes up to about 120 minutes. It is preferred that the reaction be performed at a temperature of between about 1100° C. and about 1400° C. for a period of from about 15 seconds up to about 30 minutes and at a pressure below about 400 Torr. Most preferably the reaction conditions are at a temperature of between about 1200° C. and about 1300° C. for a period of from about 1 to about 15 minutes and at a pressure below about 250 Torr. The concentrations of $TiO_2$ and $SiO_2$ preferably range from about 0.08% and about 16% by weight, more preferably these concentrations range from about 0.12% and about 2.7% by weight and most preferably between about 0.18% and about 1.5% by weight. The layered coatings consists of alternating 0.2 $\mu$m layers of $SiO_2$ and $TiO_2$ and 0.05 $\mu$m layers of $SiO_2$ and $TiO_2$ to a total coating thickness of 0.4 $\mu$m.

As will be apparent to the skilled artisan, although CVD and CVI processes are preferred as the means to produce the coated ceramic reinforcing materials of the present invention, any number or alternative processes can be envisioned for obtaining similar results. For example, physical vapor deposition (PVD) processes, sputtering, laser ablation, cathodic arc and even electrophoretic deposition processes among others can be used to produce the novel coated, non-oxide, fibrous ceramic structures of the present invention. Colloidal sol suspensions of, for example, mixed sols of $TiO_2$ and $SiO_2$ can also be used to coat individual fibers or to infiltrate fiber cloths or preforms. In such instances, the impregnated cloth commonly referred to as tow or preform, is heated to a temperature of about 1400° C. in an inert gas such as nitrogen or argon for about 2 hours to achieve phase separation and consolidation and subsequently fired at from about 1100° C. to about 1600° C. for from about one minute up to about 120 minutes prior to incorporation into a ceramic matrix composite structure.

All of the structures produced as just described demonstrate significant oxidation resistance at temperatures above 1200° C. for extended lifetimes.

Incorporation of the coated reinforcing fibers described herein into ceramic matrix composite structures or parts is accomplished by further processing according to well known conventional procedures that involve impregnation of a fiber cloth "lay up" or preform with an appropriate ceramic matrix and firing of the structure thus produced to yield a ceramic matrix composite part of a desired configuration.

There have thus been described a novel class of coated, non-oxide, ceramic reinforcing fibers comprising a core of continuous non-oxide ceramic fiber coated sequentially with, optionally, a pyrolytic carbon layer and a variety of non-hygroscopic, oxidation resistant layer(s). Non-hygroscopic and oxidation resistant compounds of silicon and titanium form the preferred basis of these improved structures. Incorporation of the coated reinforcing fibers of the present invention into ceramic matrix composite structures and parts provides more oxidation resistant and therefore longer lived such parts that are used in or exposed to oxidizing atmospheres especially at high temperatures in excess of 1200° C.

As the invention has been described, it will be apparent to those skilled in the art that the same may be varied in many ways without departing from the spirit and scope of the invention. Any and all such modifications are intended to be included within the scope of the appended claims.

What is claimed is:

1. An oxidation resistant, non-oxide ceramic reinforcing fiber stable at temperatures above about 1200° C. and comprising:

A) a continuous non-oxide fiber core coated with;

B) at least one non-hygroscopic, oxidation resistant layer selected from the group consisting of: a single monolithic layer of $Ti_3SiC_2$; sequentially applied layers of SiC and TiC; sequentially applied layers of $SiO_2$ and $TiO_2$ and in situ generated dual phase $SiO_2$ and $TiO_2$ layers.

2. The ceramic reinforcing fiber of claim 1 wherein said at least one non-hygroscopic, oxidation resistant layer is applied by chemical vapor deposition or chemical vapor infiltration.

3. A ceramic matrix composite structure comprising a ceramic matrix reinforced with an oxidation resistant, non-oxide ceramic reinforcing fiber stable at temperatures above about 1200° C. and comprising:

A) a continuous non-oxide fiber core coated with;

B) at least one non-hygroscopic, oxidation resistant layer selected from the group consisting of: a single monolithic layer of $Ti_3SiC_2$; sequentially applied layers of SiC and TiC; sequentially applied layers of $SiO_2$ and $TiO_2$ and in situ generated dual phase $SiO_2$ and $TiO_2$ layers.

4. A ceramic matrix composite structure comprising a ceramic matrix reinforced with an oxidation resistant, non-oxide ceramic reinforcing fiber stable at temperatures Above about 1200° C. and comprising:

A) a continuous non-oxide fiber core coated with;

B) at least one non-hygroscopic, oxidation resistant layer; and

C) an annular coating of pyrolytic carbon between said continuous, non-oxide fiber core and said at least one non-hygroscopic, oxidation resistant layer.

5. The ceramic matrix structure of claim 4 wherein said pyrolitic carbon coating ranges in thickness from about 1 $\mu$m to about 2 $\mu$m.

* * * * *